United States Patent [19]
Aupoix et al.

[11] 3,736,656
[45] June 5, 1973

[54] METHOD OF MANUFACTURING ASYMMETRICAL SUPERCONDUCTIVE CABLES FOR CARRYING EITHER ALTERNATING OR DIRECT CURRENT

[75] Inventors: Marcel Aupoix, Paris; Francois Moisson Franckhauser, Bretigny-sur-Orge; Jean Royet, Orsay, all of France

[73] Assignee: Compagnie Generale D'Electricite, Paris, France

[22] Filed: Nov. 17, 1970

[21] Appl. No.: 90,436

Related U.S. Application Data

[62] Division of Ser. No. 887,848, Dec. 24, 1969, Pat. No. 3,600,498.

[52] U.S. Cl..................29/599, 29/415, 29/DIG. 47, 174/126 CP, 174/DIG. 6
[51] Int. Cl..............................................H01v 11/00
[58] Field of Search..................29/599, DIG. 47, 29/415; 174/126 CP, 15 R, 15 C, DIG. 6; 335/216

[56] References Cited

UNITED STATES PATENTS

| | | | |
|---|---|---|---|
| 3,432,783 | 3/1969 | Britton et al. | 335/216 |
| 3,443,021 | 5/1969 | Schrader | 335/216 X |
| 3,427,391 | 2/1969 | Bernert et al. | 335/216 X |
| 3,507,038 | 4/1970 | Moll et al. | 29/599 |
| 3,470,508 | 9/1969 | Donadieu et al. | 174/DIG. 6 |
| 3,550,050 | 12/1970 | Albrecht | 335/216 |
| 3,570,118 | 3/1971 | Reynolds et al. | 174/DIG. 6 |
| 3,623,221 | 11/1971 | Morton et al. | 29/599 |

FOREIGN PATENTS OR APPLICATIONS

| | | | |
|---|---|---|---|
| 1,532,196 | 5/1968 | France | 335/216 |

*Primary Examiner*—Charles W. Lanham
*Assistant Examiner*—D. C. Reiley, III
*Attorney*—Sughrue, Rothwell, Mion, Zinn & Macpeak

[57] ABSTRACT

A cable for cryogenic connection having one or more pairs of conductive layers insulated electrically from each other and consisting of several super-conductors arranged in spiral formation over the opposing surfaces of the conductive layers.

11 Claims, 8 Drawing Figures

3,736,656

METHOD OF MANUFACTURING ASYMMETRICAL SUPERCONDUCTIVE CABLES FOR CARRYING EITHER ALTERNATING OR DIRECT CURRENT

CROSS-REFERENCE TO RELATED APPLICATIONS

This application is a division of application Ser. No. 887,848, filed Dec. 24, 1969, and now U.S. Pat. No. 3,600,498.

BACKGROUND OF THE INVENTION

Field of the Invention

The present invention relates to a method of manufacturing an asymmetrical cable capable of carrying either alternating or direct current.

The present invention relates to a superconductive cable capable of carrying either alternating or direct current. A superconductive cable has two portions: an "electrical" portion including at least one insulated superconductive conductor, and a "thermal" portion including a thermally insulative envelope and a circulating refrigerating fluid.

SUMMARY OF THE INVENTION

The invention more particularly concerns a superconductive inductor suitable for use in the construction of a cable capable of carrying either a direct current or an alternating current. The invention is intended to provide a superconductive conductor structure allowing the realization of a single conduction of considerable length (several kilometers) without requiring welding of several sections together. The invention is also intended to provide a conductor structure able to carry either an alternating current or a direct current, no matter what the degree of purity of the direct current.

In accordance with one aspect of the invention, there is provided a superconductive conductor for carrying direct or alternating current, comprising, a ribbon of pure metal in which are buried longitudinally extending superconductive elements, the ribbon having one face covered with a thin layer of copper and the face of the thin copper layer not in contact with the ribbon being covered with a layer of superconductive material. Preferably, wires or strips having a high mechanical strength are embedded in the ribbon, parallel to the superconductive elements.

In accordance with another aspect of the invention, there is provided a method of manufacturing a superconductive conductor for carrying direct or alternating current, comprising, a ribbon of pure metal in which are buried longitudinally extending superconductive elements, the ribbon having one face covered with a thin layer of copper and the face of the thin copper layer not in contact with the ribbon being covered with a layer of superconductive material, the method including the steps of: covering one face of each of the two strips of superconductive material with a thin layer of copper; placing the two strips together with the faces not covered with copper in contact with each other; coating the assembly of the two strips with a pure metal and burying, in the pure metal on each side of the assembly, a group of superconductor elements extending longitudinally of the strips; and removing the side portions of the pure metal coating to obtain two superconductive conductors.

In accordance with a further aspect of the invention there is provided a superconductive cable comprising a "thermal" portion including thermal insulation elements and an arrangement for circulating a refrigerating fluid, and an "electrical portion" for carrying an electric current and including at least one conductor assembly of two coaxial and cylindrical electrically conductive layers each formed by a helicoidal winding of a superconductive conductor. The superconductive conductor comprising a ribbon of pure metal in which are buried longitudinally extending superconductive elements, the ribbon having one face covered with a thin layer of copper and the face of the thin copper layer not in contact with the ribbon being covered with a layer of superconductive material. The two conductive layers are separated by an electrical insulator and are in contact with the refrigerating fluid.

Preferably the superconductive coatings of the conductors of the two layers face each other. Advantageously, the angle which the conductors make with the generatrices of the cylinder on which they are rolled is approximately Arc Cos K where K is the ratio of the coefficient of thermal expansion of the metal to that of the insulator.

The invention will be better understood by the following description of a preferred embodiment, given by way of example and with reference to the accompanying drawings, wherein.

Figure 1:
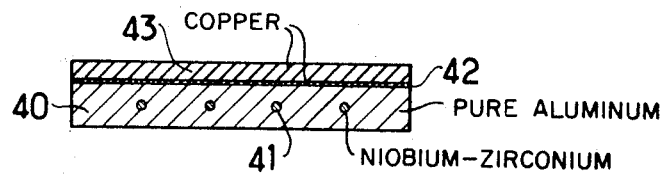
FIGS. 1 and 2 show two forms of construction of a superconductive conductor shown in cross-section.

The conductor of FIG. 1 is in the form of a ribbon 40 of a pure metal chosen from refined aluminum and electrolytic copper. In the ribbon 40 are buried wires 41 of a superconductive material such as niobium-zirconium, niobium-titanium, or niobium-tin. The ribbon 40 is also covered with a layer 42 of copper, on which is deposited a layer 43 of superconductive material. When the conductor is cooled below the critical temperature of the superconductive material, it can carry a direct current by means of the conductors 41 and, by means of layer 43, it can carry either an alternating current or the harmonics or parasite components of an impure direct current whose pure component is carried by the wires 41.

Figure 2:
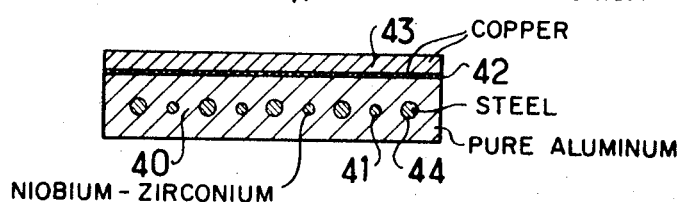

The conductor shown in FIG. 2 differs only in that wires 44 of high mechanical strength, such as those of steel or aluminum alloy, are added.

Figure 3A:
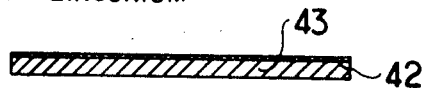
FIGS. 3a to 3d show the method of construction of the conductor shown in FIG. 1.
Figure 3B:
Figure 3C:
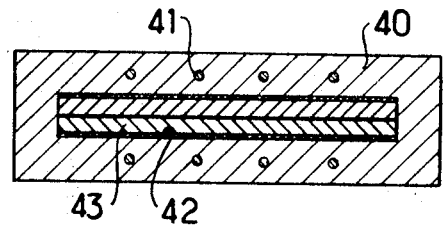
Figure 3D:
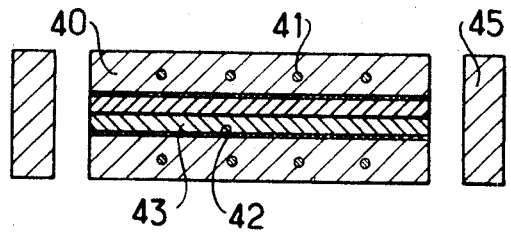

FIGS. 3a to 3d show the method of construction of the conductor shown in FIG. 1. Two superconductive ribbons such as 43 (FIG. 3a), each covered with a layer of copper 42, are placed with their faces, which are not copper-covered, in contact with each other by extrusion, these two ribbons 43 are coated with refined aluminum (or pure copper) 40, in which are buried wires 41 of superconductive material. The wires 41 are equal in number on each side of the two ribbons 43 (FIG. 3c). The side portions 45 are removed to obtain two stabilized superconductive conductors such as that shown in FIG. 1.

The conductor shown in FIG. 2 is obtained in the same way, by incorporating wires or strips of a material of high mechanical strength (such as steel or aluminum alloy) during the extrusion process, and at the same time as the superconductive wires are incorporated.

Figure 4:
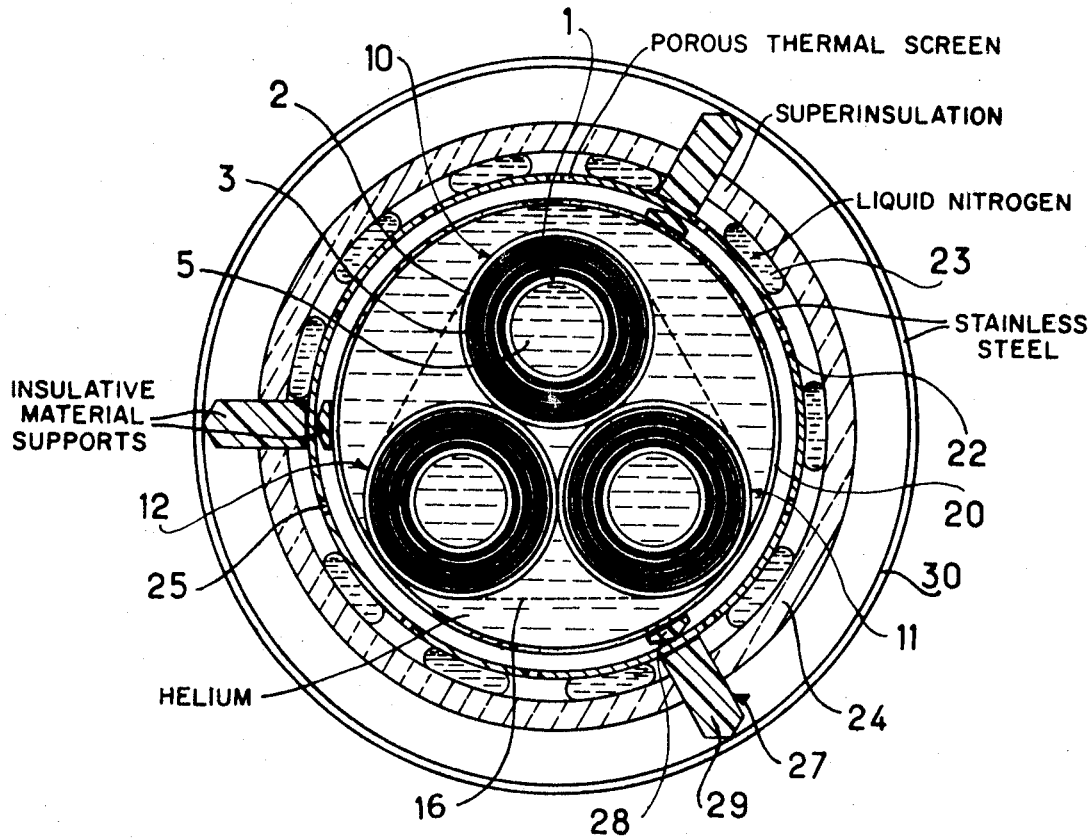
FIG. 4 shows a three-phase superconductive cable in cross-section.
Figure 5:
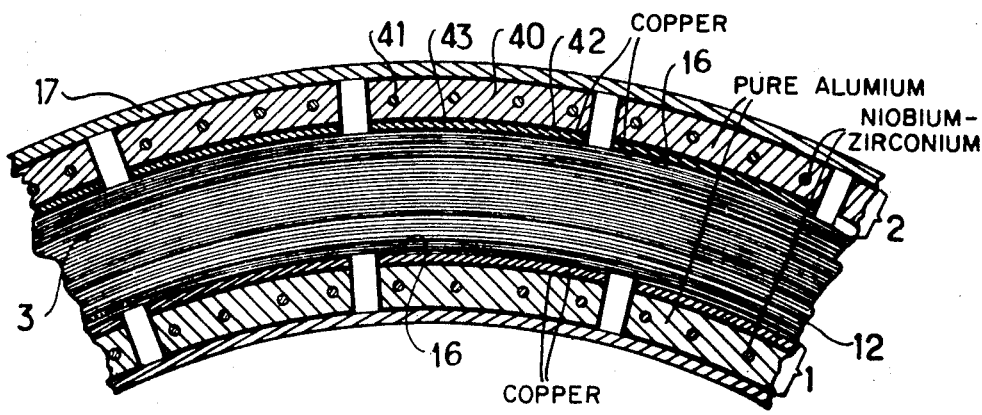
FIG. 5 shows a detail of FIG. 4.

FIG. 4 shows a three-phase alternating current cable provided with conductors such as that described with reference to FIG. 1. The cable comprises three assemblies 10, 11, 12, each assembly including two coaxial cylindrical conductive layers 1 and 2 separated by an insulator 3. The conductive layers, shown in detail in FIG. 5, are each in the form of a winding of at least one superconductive conductor of the type shown in FIG. 1.

The winding is preferably helicoidal, the angle between the conductors and the generatrices of the cylinders being approximately Arc cos K, where K is the ratio of the coefficients of thermal expansion of the conductor and insulator. Thus, the length of an assembly is constant no matter what its temperature. As shown in FIG. 5, each conductor assembly also includes an equipotential sheet 15 on each side of the electrical insulator 3, and a protective layer 17 surrounding the sheet 2.

The layers 1 and 2 can be equally well formed by conductors such as those shown in FIG. 2. Each of the assemblies 10, 11, 12 is internally provided with a cryogenic fluid circulation channel 5, while the three assemblies lie in a sealed metallic housing 20 in which cryogenic fluid also circulates. Thus, the three conductor assemblies are surrounded internally and externally with a refrigerating fluid, such as hypercritrial helium, which circulates in the same sense in the channels 5 and housing 20. This circulation assures maintenance of the conductor assemblies at a constant, low temperature.

The assemblies 10, 11, 12 rest in the housing 20, with adjacent assemblies being in contact with each other, while two of the assemblies 11 and 12, in FIG. 4, rest on the bottom of the housing 20. The conductor assemblies are kept pressed together by a wire or tape 16 of, for example, a synthetic material such as that known under the registered trademark "TERGAL." The sealed enclosure 20 is surrounded by a second sealed enclosure 30. Enclosures 20 and 30 are made of stainless steel and are separated by an evacuated space containing a porous thermal screen 22 supercooled by liquid nitrogen circulating in conduits 23. The evacuated space also contains a superinsulative layer forming a superinsulative thermal overlay 24 surrounding the thermal screen 22. The screen 22 is made of a porous material or is provided with perforations such as 25, so that a vacuum exists in the space between the housings 20 and 30, on both sides of the thermal screen 22 covered by the superinsulative layer.

The housings 20 and 30 are held apart by means of supports 27, advantageously constructed in several sections placed end to end and presenting a high thermal resistance which opposes the transfer of heat from the housing 30 at ambient temperature to the housing 20 at cryogenic temperature.

As shown in FIG. 4, a first section 28 bears against the housing 20 and the thermal screen 22, and a second section 29 bears against the thermal screen 22 and the outer housing 30. Each section 28,29 has an end portion of small cross-section facing the outside of the cryogenic cable. These supports 27 located in a vacuum are advantageously made from an electrical insulator so as to electrically insulate the internal housing from the external housing 30.

The use of such a cryogenic cable offers numerous advantages. In use, the conductor assemblies 10, 11, 12, are well cooled and maintained at a constant temperature. The distribution of currents and voltages in the cryogenic cable is as follows:

| Conductor Assembly | Conductive Layer | Current | Voltage |
| --- | --- | --- | --- |
| 10 | 1 | $I_1$ | $V_1$ |
|    | 2 | $I_1$ | $V_0$ |
| 11 | 1 | $I_2$ | $V_2$ |
|    | 2 | $I_2$ | $V_0$ |
| 12 | 1 | $I_3$ | $V_3$ |
|    | 2 | $I_3$ | $V_0$ |

Where $V_0$ is the neutral potential.

As a result of the current distribution, the metallic housings 20 and 30 are not subjected to a magnetic field, which avoids all losses due to induced currents. Similarly, as a result of the voltage distribution, the internal housing 20 is maintained at a neutral potential. Inasmuch as the outer housing 30 is maintained at ground potential, the electrical insulation between the outer housing 30, the inner housing 20, and assemblies 10, 11, 12, carries only a few volts, and perfect insulation is easily obtained. This electrical insulation is obtained by the electrically insulative supports 27 and the evacuated space between the housings 20 and 30.

In the structure particularly described above and shown in FIGS. 4 and 5, thermal insulation is provided by the porous thermal screen 22, the superinsulative layer 24, and it is completed in the supports 27 by the high thermal resistance of the supports themselves thus reducing the heat exchange between the external housing 30, which is held at a temperature of the order of 300° Kelvin, the thermal screen 22, which is held at a temperature of 77° Kelvin and the internal housing 20, which is held at 4.2° Kelvin.

What is claimed is:

1. A method of manufacturing asymmetrical superconductive conductors for carrying direct or alternating current by symmetrical process steps wherein said asymmetrical conductor produced thereby comprises: a ribbon of pure metal in which are buried longitudinally extending superconductive elements, the ribbon having one face covered with a thin layer of copper and the face of the thin copper layer not in contact with the ribbon being covered with a layer of superconductive material, the method comprising the steps of:
   a. covering one face of each of two strips of superconductive material with a thin layer of copper;
   b. placing the two strips together with the faces not covered with copper in surface contact with each other;
   c. extruding pure metal about the assembly of the two strips to embed copper coated strips with said pure metal and burying a group of superconductor elements extending longitudinally of the strips in the pure metal on each side of the assembly; and
   d. removing the side portions of the pure metal to form a ribbon of pure metal for each conductor and separating said contacting faces of said strips to obtain two asymmetrical superconductive conductors.

2. A method as claimed in claim 1 wherein the pure metal is copper.

3. A method as claimed in claim 1 wherein the pure metal is aluminum.

4. A method as claimed in claim 1 wherein the superconductor strips are wires.

5. A method as claimed in claim 1 wherein the superconductor strips are flat.

6. A method as claimed in claim 1 wherein the number and arrangement of said superconductor elements are the same in each group, whereby the two superconductive conductors obtained are identical.

7. A method as claimed in claim 1 wherein each superconductor strip further comprises longitudinally extending strands of material having a high mechanical strength embedded in the ribbon of pure metal, the method including the further step of embedding in the pure metal on each side of the assembly a group of strands of material having a high mechanical strength, the strands extending parallel to the superconductor elements.

8. A method as claimed in claim 7 wherein the strands are in the form of wires.

9. A method as claimed in claim 7 wherein the strands are in the form of flat strips.

10. A method as claimed in claim 7 wherein the material having a high mechanical strength is steel.

11. A method as claimed in claim 7 wherein the material having a high mechanical strength is an aluminum alloy.

* * * * *